United States Patent [19]
Lazorisak et al.
[11] 4,064,213
[45] Dec. 20, 1977

[54] CREPING PROCESS USING TWO-POSITION ADHESIVE APPLICATION

[75] Inventors: Nicholas W. Lazorisak, Hockessin, Del.; Fredric A. Christiansen, West Chester; John M. Harriz, Ridley Park, both of Pa.

[73] Assignee: Scott Paper Company, Philadelphia, Pa.

[21] Appl. No.: 656,710

[22] Filed: Feb. 9, 1976

[51] Int. Cl.[2] .......... B32B 3/28; B31F 1/14

[52] U.S. Cl. .......... 264/134; 156/183; 162/112; 264/283; 427/155; 427/257; 427/276

[58] Field of Search .......... 162/111, 112, 168 R, 162/184, 199, 281; 156/183; 264/282, 283, 134; 427/155, 257, 276

[56] References Cited

U.S. PATENT DOCUMENTS

| | | | |
|---|---|---|---|
| 962,505 | 6/1910 | Funke et al. | 162/112 |
| 1,914,869 | 6/1933 | Rowe | 156/183 |
| 2,343,930 | 3/1944 | Rowe | 264/283 |
| 2,494,723 | 1/1950 | Rowe | 264/283 |
| 2,610,935 | 9/1952 | Rowe | 264/283 |
| 3,065,486 | 11/1962 | Scott | 162/281 |
| 3,812,000 | 5/1974 | Salvucci et al | 162/168 R |
| 3,821,068 | 6/1974 | Shaw | 162/168 R |

*Primary Examiner*—S. Leon Bashore
*Assistant Examiner*—Peter F. Kratz
*Attorney, Agent, or Firm*—Nicholas J. De Benedictis; John W. Kane

[57] ABSTRACT

Mechanical creping of fibrous webs is improved by employing two creping adhesives applied at different points in the papermaking process and having relatively different adhesive properties for adhering the web to the creping surface. The process crepes the web from a conventional creping surface by applying a layer of a first creping adhesive directly onto the creping surface while applying a second creping adhesive to the web, followed by pressing the web onto the already formed layer of first creping adhesive and then creping the web from the creping surface.

9 Claims, 1 Drawing Figure

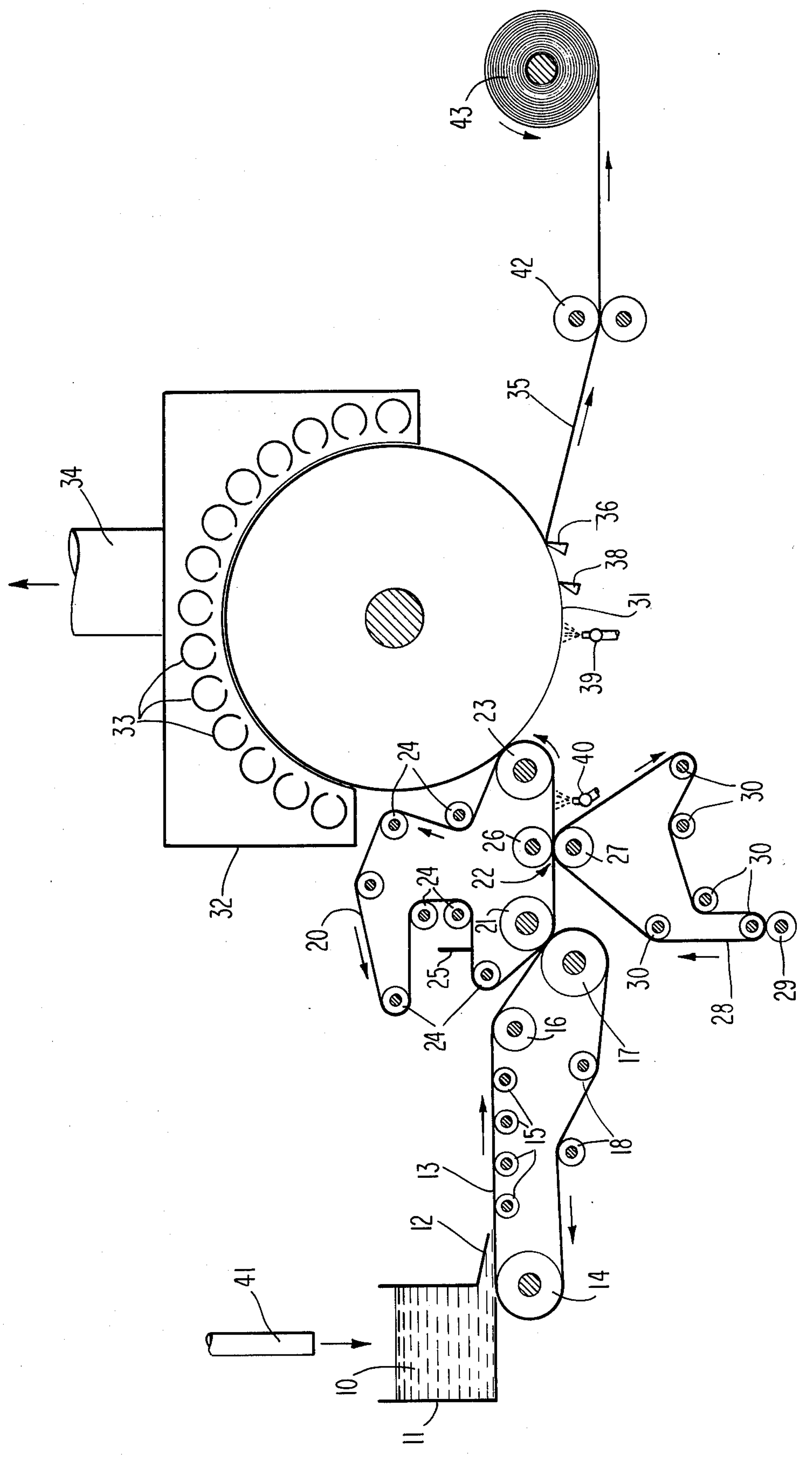
10
11
12
13
14
15
16
17
18
20
21
22
23
24
25
26
27
28
29
30
31
32
33
34
35
36
38
39
40
41
42
43

CREPING PROCESS USING TWO-POSITION ADHESIVE APPLICATION

BACKGROUND OF THE INVENTION

1. Field of the Invention

This invention concerns mechanical creping of wet-laid or dry form (air-laid) webs. More particularly this invention concerns controlling the mechanical creping process by employing two creping adhesives having properties different then each other.

2. Description of the Prior Art

Paper webs are conventionally softened by working them in different ways such as by mechanically creping them from a surface, usually a drying surface such as a Yankee dryer with a creping doctor blade. Such a process disrupts and breaks many of the inter-fiber papermaking bonds in the paper web which are formed during drying. These inter-fiber bonds are the principle source of strength in ordinary paper since very little strength results from the physical entanglement of the fibers.

Creping adhesives have been employed for adhering the webs to the creping surface sometimes in combination with release agents in order to control the degree of adhesion between the web and the creping surface. Control of the adhesion permits the continuous production of creped webs having substantially uniform characteristics imparted by the creping process.

Creping adhesives have also been used for adhering relatively dry paper webs to a creping surface since such dry webs do not have the usual natural adherence obtained by pressing wet webs to a creping surface.

The softness of paper webs has been increased by chemically impeding or preventing the inter-fiber papermaking bonds with a chemical debonder which also tends to weaken the sheet. Usually a wet or dry strength chemical is added to the sheet to make up for the strength loss caused by the chemical debonder. Unfortunately, the chemical debonders also tend to interfere with proper adhesion of the fibrous webs to a creping surface which tends to prevent creping of a chemically debonded web.

Creping adhesives have been added to the paper sheet or directly on to the creping surface to overcome the effect of the chemical debonder and obtain proper adhesion between the chemically debonded fibrous sheet and the creping surface.

The nature of the finished paper depends upon the mechanical forces at the locus of removal of the web from the cylinder, and also upon the angle of removal. Without a doctor blade or with a doctor blade substantially tangent to the circumference of the cylinder, the paper tends to have a smoother, "machine-glazed" finish. If the doctor blade is at an angle to the tangent, the finished paper is creped and this procedure is known as "creping off the Yankee drier."

In spite of the many desirable advantages which accrue in creping from Yankee driers, there is often much difficulty in maintaining smooth removal of the web by the doctor blade. This operation requires a delicate balance between the adhesive forces holding the web uniformly on the cylinder surface and the releasing forces occurring at the source of contact with the doctor blade. The creping forces can get out of balance. Too great of an adhesive force can result in "pickouts" of paper, or fibers remaining with the dryer surface and the inability of the cleaning doctor to remove sufficient adhesive from the dryer to avoid buildup of adhesive and an irregular surface. On the other hand, too little of an adhesive force can result in the paper being removed from the creping surface without sufficient creping action being applied to the web. Many attempts have been made to attain this needed balance but none have been entirely satisfactory. The present invention provides the desired control and balance.

SUMMARY OF THE INVENTION

A method is provided for mechanically creping a web from a creping surface by applying a layer of a first creping adhesive directly onto the creping surface, applying a second creping adhesive to the web, pressing the web onto the already formed layer of first creping adhesive to contact the second creping adhesive with the first creping adhesive for adhesively attaching the web to the creping surface, and creping the web from the creping surface. The invention also provides for the first creping adhesive to be relatively softer than the second creping adhesive so that when creping the web from the creping surface with a creping doctor blade, the blade tends to shear the layer of first creping adhesive rather than the second creping adhesive. The mechanical creping action can be controlled by adjusting (1) the quantity of first creping adhesive applied to the creping surface, (2) the quantity of second creping adhesive applied to the web and (3) the ratio of first and second creping adhesives.

BRIEF DESCRIPTION OF THE DRAWINGS

The FIGURE schematically illustrates a papermaking process employing the present invention.

DETAILED DESCRIPTION OF THE INVENTION

The drawing illustrates one type of conventional Fourdrinier papermaking machine with which the present invention can be used. The papermaking machine is illustrative of the double-felt type, on which paper furnish 10 flows from a headbox 11 through a slice 12 onto the substantially horizontal surface of a Fourdrinier wire 13 through which water is withdrawn and upon which web formation takes place. Wire 13 is entrained around breast roll 14 and over a plurality of table rolls 15 to a wire turning roll 16. It is then fed around a lower couch roll 17 and around to other guide rolls 18 back to breast roll 14. One or more of the above-described rolls is driven and propels the Fourdrinier wire 13 through the desired path so that the upper surface or flight moves from the breast roll 14 to the lower couch roll 17 and returns along the bottom. In addition, one or more vacuum boxes, deflectors, and hydrofoils (not shown) may be employed between table rolls 15 to assist in the removal of water from the web during its formation.

The wet web formed on the upper surface of Fourdrinier wire 13 is transferred to a pickup felt 20, which is pressed into engagement with the web on wire 13 by means of an upper couch roll 21. The pickup felt 20 meeting wire 13 moves in the same direction as the wire 13, as indicated in the drawings, and at substantially the same speed. Pickup felt 20 carrying the newly formed web is advanced through the nip of a press assembly, indicated generally by reference numeral 22. Felt 20 is then moved around a pressure roll 23 which may be of the suction type, and hence, is entrained around a plurality of guide rolls 24 back to upper couch roll 21. A guard board 25 and shower (not shown) are employed adjacent the surface of felt 20 in front of the point where it contacts the newly formed sheet and accomplishes pickup. Guard board 25 and the showers clean and condition the felt to receive the wet web.

Press assembly 22 comprises a upper press roll 26 and a lower press roll 27, one of which is a suction press roll. A wet felt 28 is entrained over a plurality of guide rolls 30 and over lower press roll 27. One or more of the rolls contacting wet felt 28 and pickup felt 20 is driven to insure movement thereof at the proper speed. Moisture is removed from the newly formed web in the nip of a press assembly 22 and transferred into wet felt 28. It is normally removed from wet felt 28 by a wringer roll 29.

The formed and pressed web on felt 20 issuing from the nip of press assembly 22 is then pressed into engagement with the surface of the rotating drying cylinder 31 of a conventional Yankee dryer. The Yankee dryer includes a hood 32 surrounding a portion of the surface of cylinder 31 contacted by the web. Hood 32 includes therein a plurality of air input nozzles 33 and an exhaust means 34 for removing air from the chamber enclosed by hood 32. This flow of air within hood 32 over the surface of the web carried on the drying cylinder 31 assists in removing moisture from the web and accomplishing drying. The paper web 35 shown issuing from the opposite side of drying cylinder 31 is removed from the surface of drying cylinder 31 by a conventional doctor blade 36 which accomplishes creping of the web. Web 35 is pulled from the vicinity of Yankee dryer 31 by passing the web 35 through a nip formed by a pair of rolls 42, from which it is conventionally wound into a roll 43.

With this description of a conventional Fourdrinier papermaking machine, the apparatus for applying creping adhesives in the manner of the invention will now be described. The creping adhesives are applied at two or more locations. The first location is by spray means 39 to the surface of the Yankee dryer 31, and the other location is by way of spray means 40 to the wet web carried upon pickup felt 20 and/or by application of the adhesive into the paper furnish 10 in the head box 11 by conventional means (illustrated by the pipe 41). The spray means 39 which applies the first creping adhesive to the Yankee surface 31 consists of a series of spray nozzles attached to a header pipe extending across the width of the Yankee surface 31 in a conventional manner. The nozzles are spaced apart from each other so as to have overriding spray patterns. By properly spacing the spray nozzles in a manner known in the art, the application of the adhesive is generally uniform across the width of the Yankee surface 31.

Spray application means 40 is provided by an apparatus similar in structure to spray means 39, but extending across the width of the pickup felt 20 at a point close to where the wet paper web is pressed to the Yankee surface 31 by press roll 23. The second creping adhesive applied through spray means 40 is applied to the surface of the wet paper web which will face the Yankee surface 31. As can be readily appreciated, the ratio of quantity of the first creping adhesive applied by spray means 39 to the quantity of second creping adhesive applied at spray means 40 can be accurately and quickly controlled by adjusting the flow at each spray means. The application of a third creping adhesive into the slurry, if desired, can be accomplished by well known conventional means, such as methods for the applicaton of wet strength resins, and is illustrated only schematically as pipe 41. After the paper web 35 is creped from the Yankee cylinder 31 by means of doctor blade 36, a residual film of creping adhesive remains on the Yankee surface 31. Most of this film is removed by conventional cleaning doctor 38, but a very thin uniform layer remains on the cylinder surface 31.

Spray means 39 are positioned as close as possible after the cleaning doctor 38 so that the first creping adhesive applied to the Yankee surface 31 will be heated by the Yankee surface 31 sufficiently before the wet web is applied to the Yankee surface to form a definitive layer of first creping adhesive upon which the paper web and the second creping adhesive are pressed. This definitive layer can be more satisfactorily formed if spray means 39 for spraying the first creping adhesive are positioned a significant distance from the location where the paper web is pressed to the Yankee surface 31.

The drawing shows the first creping adhesive being sprayed from sprayer tube 39 onto a rotating creping surface 31 which rotates clockwise. A continuous layer of this first creping adhesive is formed on the creping surface 31 prior to the point where the web is pressed against the creping surface. The first creping adhesive applied to the creping surface 31 should be applied at a rate of from about 0.01% to about 1.0% based upon the air-dry weight of the web.

While the first creping adhesive is shown in the figure as being sprayed onto the creping surface to form a layer on the surface, other methods of applying the creping adhesive to the creping surface are suitable including the use of fountain coaters, and reverse blade coaters which are well known.

With reference to the figure, the web 35 is pressed onto the creping surface 31 from pickup felt 20 by pressing roller 23. At this critical point of engagement of the web 35 onto the creping surface, the web already contains the second creping adhesive and a film of the first creping adhesive has already been formed on the creping surface 31. This aspect is the critical point of the invention. It is critical in practicing the present that:

1. a layer of first creping adhesive is formed on the creping surface;
2. the web is pressed onto the formed layer of first creping adhesive on the creping surface;
3. at the time when the web is pressed onto the layer of first creping adhesive, the web has already been treated with a second creping adhesive so that the pressing of the web contacts the second creping adhesive with the already formed layer of first creping adhesive.

The above critical sequence in the process of the present invention results in a web being adhesively attached to a creping surface by two discrete adhesives. While there may be some intermixing of adhesives at the adhesive interface, a layer consisting essentially of the first creping adhesive exists adjacent to the creping surface.

The web 35 is adhesively attached to the creping surface 31, rotates with the creping surface and is creped from the creping surface by a creping doctor blade 36. The creping doctor blade is urged against the creping surface 31 with a force sufficient to overcome the adhesive force of the web to the creping surface and accordingly the web is creped and removed from the creping surface.

A particular and unique advantage of the present invention is the controlability of the creping process to produce consistent uniform product. Because of the use of two distinct creping adhesives, the creping process can be controlled by adjusting the type and/or quantity of the first creping adhesive, and by adjusting the type and/or quantity of the second creping adhesive. Furthermore, the relative adhesive characteristics between the first and second creping adhesives can be adjusted in terms of there relative hardness or softness.

The present system permits the adhesive bond with the creping surface to be determined primarily by the characteristics of the first creping adhesive while the adhesive bond with the web is determined primarily by the characteristics of the second creping adhesive. These bonds can be separately controlled. Accordingly, the web can be tenaciously adhered with a hard creping adhesive while the creping blade can be cutting in the layer of the first creping adhesive to permit good removal without irregular surface buildup which causes plugging.

Problems usually associated with creping can be controlled with the present invention. For example a creping problem known as picking or plugging which results in holes in the paper and believed to be caused by excessive adhesion with the creping surface can be corrected by increasing the amount of the softer first adhesive applied to the creping surface. At other times the creped sheet may be too harsh with a blister type crepe indicating that the web is "too loose" or not adhered strongly enough to the creping surface. This condition can be corrected by decreasing the amount of first adhesive or increasing the amount of the second adhesive.

The film of the first should be softer than the second adhesive which results in the blade 36 riding in the layer of first adhesive and shearing the layer during the creping action. In such an embodiment, there remains on the creping surface, 31 immediately after the creping blade 36 a layer consisting essentially of the first creping adhesive. Most of this layer of the first creping adhesive is removed by a cleaning doctor blade 38 located behind the creping doctor blade 36 shown in the figure. A film having a glass transition temperature of less than about 30 10° C will be softer than adhesives suitable for use as the second creping adhesive.

In addition to individually controlling the adhesive bonds with the creping surface and with the web, the rheology of the film or layer of first adhesive can be adjusted independently of the adhesive bond imparted to the web by the second adhesive. Accordingly, the flow and shearing characteristics of the layer of first adhesive can be separately controlled. With such a system, the fibrous web can be tenaciously adhered by means of the second adhesive while the creping doctor blade can function in the layer or film of first creping adhesive which has film and shear characteristics independently selected to optimize the shearing of the film from the creping surface by the creping doctor blade.

The present invention produces a more uniformly and more extensibly creped web in comparison to employing only the first creping adhesive because of the superior adhesion of the web imparted by the second creping adhesive. Furthermore, superior product uniformity is obtained in comparison to employing just the second creping adhesive because of the superior shearing characteristics of the layer of first creping adhesive which permits controlled, uniform, consistent creping which minimizes chattering of the creping blade and plugging of the web.

Particularly good creping control is obtained when the first creping adhesive is a latex of a polymer that is essentially non-cross-linking. An example of such an adhesive is a non-cross-linking copolymer of vinyl acetate and acrylic esters. The latex is formed by emulsifying the copolymer that has been stabilized with a nonionic hydrocolloid in the ratio of about 3 part by weight copolymer to about 1 part by weight hydrocolloid. The resulting latex is an emulsion of the copolymer and hydrocolloid having a large particular size (usually 1 micron). The presence of the hydrocolloid molecules in the emulsion imparts water redispersibility so that a dried film obtained from the emulsion is water redispersible when contacted with water and thereby tends to reemulsify. The advantage of using essentially non-cross-linking (thermoplastic) polymers is that the rheology of the thermoplastic polymer system in the emulsion is substantially retained when a dried film is formed of the emulsified components (non water components) even when the film is heated such as when the latex is sprayed onto the surface of a Yankee dryer.

Hydrocolloids suitable for use for imparting water redispersibility to emulsified copolymers are well-known in the latex art and are water soluble polymers that function as protectors in the formulation of an emulsion of a non-water soluble polymer and which tend to be electrochemically attached to the copolymer. Typical known hydrocolloids are hydroxyethyl cellulose, methyl cellulose, alginates and polyvinyl alcohols. An example of a non-water dispersible polymer that can be combined with a hydrocolloid and emulsified to produce a water based colloidal emulsion, the solid components of which produce a dried film that is redispersible in water is a vinyl acetate-acrylate copolymer available from National Starch Corporation as Latex No. 4441 or Latex No. 4442, which have a molecular weight of about 2,000,000, a glass transition temperature of about −40° C and a Sward Rocker hardness of about 3.

Water redispersible latexes, as exemplified above, should be a water based emulsion of a non-cross-linking polymer combined with a hydrocolloid so that a film of the solids in the emulsion (non-water components) is water redispersible, sufficiently soft to have a glass transition temperature lower than about −10° and preferably from about −20° C to about −50° C and have a Sward Rocker hardness between about 1 and about 4. Such polymers usually have a molecular weight of about 2,000,000.

Sward Rocker Hardness values and the test procedure are described in "Paint Testing Manual" G. G. Sward, Editor, ASTM Special Technical Publication — 500 and also described in "Surface Coatings And Finishes" Gordon & Dolgin, Chemical Publishing Co., 1954.

There are particular advantages associated with employing the water redispersible latex adhesive described above as the first adhesive in practicing the present invention. Such latexes produce a particularly suitable film in which the creping doctor blade tends to ride and shear the film for creping the web from the creping surface and in addition any residue of the first creping adhesive which becomes deposited upon the papermaking felt or permeates other areas of the papermaking process is readily removable due to its water redispersibility. However, other adhesives are suitable for use as the first adhesive in practicing the invention provided they are softer than the second adhesive as can be indicated by a lower glass transition temperature for a film of the first adhesive than a film of the second adhesive. Relative softness between the two adhesives can also be determined by measuring the adhesive strength of each adhesive with the weaker adhesive being softer. Another good indication of relative softness is the modulus of elasticity. A lower modulus indicates a softer adhesive.

Latexes made from polymers capable of forming an emulsion in water either with or without normal emulsifiers are suitable. Preferably a film of the polymer solids has an initial modulus of less than about 2 × $10^7$ dynes/$cm^2$ and a glass transition temperature less than about +10° C. The initial molulus referred to above is an initial modulus at 1% elongation for a film of a solid being tested according to ASTM Test D 638. Examples of suitable emulsion polymers (latexes) are water emulsions of acrylates; styrenebutadienes; polybutadienes; acrylonitriles; acrylontrile-butadienes; polyurethanes; ethylenevinyl acetates; polyvinyl alkyl ethers; polyacetals; polyterpenes; vinyl acrylics; ethylene-vinyl acrylates; polychloroprenes; polyhalohydrins; acrylate-acetate copolymers; plasticized polyvinyl chlorides and plasticized polyvinyl acetates. An example of a commercially available latex suitable for use as the first adhesive though it does not produce a water redispersible film is an acrylic ester copolymer emulsion available from Rohm & Haas under the tradename HA-8, having a glass transition temperature of about −13° C and an initial modulus of about 7 × $10^6$ dynes/$cm^2$.

Adhesives suitable for use as the second adhesive include the adhesives normally used as creping adhesives either added to the wet end of the papermaking process or to the web prior to contacting the creping surface. Such adhesives include the polyamines, polyamides, water soluble acrylates, animal glues, polyacrylamides, and polyacrylic-polyacrylamide copolymers. The above adhesives are water soluble have a viscosity in the range of about 50 cps to about 1,000 cps for solution having a solids content from about 7% to about 70% by weight; and a molecular weight of from about 150,000 to about 1,000,000.

The second adhesive when added to the wet end is added in amounts to result in from about 0.1% to about 4.0% adhesive based upon the air dry weight of cellulosic fibers in the furnish. When added directly to the formed web, the second adhesive should be added in amounts of from about 0.05% to about 4.0% based upon the air dry weight of the web.

The method of the present invention may be applied to a wide variety of webs in order to form creped sheet materials by the easily controllable process of the present invention. This means that a wide variety of processes may be utilized to form the web. The preferred means is by depositing fibers on a foraminous surface from a suspension in a fluid medium such as a water based furnish deposited upon a Fourdrinier wire as illustrated in the drawing. The invention is particularly suitable for creping wetlaid sheets whose natural fiber to fiber bonding in the formed web has been impeded or prevented either by chemical means (chemical debonders) or by the avoidance of wet pressing during the sheet formation and drying.

Suitable webs are preferably those having a basis weight between about 5 and about 55 pounds per 2,880 square feet. Such basis weight sheets particularly when chemically debonded derive the most benefit from the improved and controllable creping process of the present invention.

What is claimed is:

1. A method of creping a web from a heated creping surface comprising:

applying a layer of a first creping adhesive directly onto the heated creping surface;

applying a second creping adhesive to the web;

pressing the web onto the already formed layer of first creping adhesive to contact the second creping adhesive with the first creping adhesive for adhesively attaching the web to the creping surface;

creping the web from the creping surface;

said first creping adhesive being softer than said second creping adhesive and wherein said creping of the web from the creping surface is accomplished with a creping blade urged against the creping surface with sufficient force to crepe by shearing said layer of first creping adhesive whereby said second creping adhesive is essentially removed from the creping surface and a layer consisting essentially of said first creping adhesive is retained on said creping surface after creping the web from the creping surface.

2. The method of claim 1, wherein said heated creping surface is a rotating creping surface and said pressing of the web onto the creping surface is at a point disposed in the direction of rotation away from the point on the creping surface where the layer of first creping adhesive is being applied whereby a definitive layer of first creping adhesive is formed by heating before pressing the web onto the layer.

3. The method of claim 1, wherein the creping of the web from the creping surface is controlled by changing the ratio of the quantity of first creping adhesive applied directly onto the heated creping surface to the quantity of second creping adhesive applied to the web, and the quantity of first creping adhesive is from about 0.01% to about 1.0% based upon the air dry weight of the web and the quantity of second creping adhesive is from about 0.05% to about 4.0% based upon the air dry weight of the web.

4. The method of claim 1, wherein the first creping adhesive is a latex that produces a water redispersible layer containing the solid components of the latex, said latex having a lower glass transition temperature than the second creping adhesive.

5. The method of claim 3 wherein said first creping adhesive is a latex that produces a water redispersible layer having a glass transition temperature lower than about +10° C.

6. The method of claim 3 wherein the first creping adhesive is a latex and the layer has a glass transition temperature of less than about +10° C and comprises essentially non-cross linking polymers.

7. A method of creping a web from a heated rotating creping surface comprising:

applying a water emulsion of a first adhesive directly onto the heated creping surface to produce an adhesive layer of the emulsified components on the heated creping surface;

applying a second creping adhesive to the web;

pressing the web onto the already formed adhesive layer in order to contact the second creping adhesive with the adhesive layer for adhesively attaching the web to the creping surface; and creping the web from the creping surface;

wherein a film of the emulsified components of the first creping adhesive has a glass transition temperature of less than about +10° C said first creping adhesive being softer than said second creping adhesive and wherein the creping of the web from the creping surface is performed with a creping doctor blade urged against the surface with sufficient force to crepe by shearing said layer of first creping adhesive so that the second creping adhesive is essentially removed from the creping surface with the creped web and a retained layer consisting essentially of the first creping adhesive remains on the creping surface after creping the web from the creping surface.

8. The method of claim 7, further comprising removing a part of the retained layer from the creping surface with a cleaning doctor blade.

9. The method of claim 7 wherein the first creping adhesive is applied as a water based emulsion of a thermoplastic polymer.

* * * * *